Jan. 23, 1923.

C. S. ASH.
VEHICLE WHEEL.
FILED AUG. 10, 1918.

1,442,846

INVENTOR
C. S. Ash
BY
Duell, Warfield & Duell
ATTORNEYS

Patented Jan. 23, 1923.

1,442,846

UNITED STATES PATENT OFFICE.

CHARLES S. ASH, OF GENEVA, NEW YORK.

VEHICLE WHEEL.

Application filed August 10, 1918. Serial No. 249,282.

*To all whom it may concern:*

Be it known that I, CHARLES S. ASH, a citizen of the United States, residing at Geneva, in the county of Ontario and State of New York, have invented certain new and useful Improvements in Vehicle Wheels, of which the following is a full, clear, and exact description, such as will enable others skilled in the art to which it appertains to make and use the same.

This invention relates to vehicle wheels, and more specifically to improvements in the construction and design of rims of such wheels adapted for application thereon of pneumatic tires.

One of the objects of the invention is to provide a relatively strong and light metal wheel rim capable of carrying an inflatable tire either of the clincher or straight side quick detachable type.

Further objects are to improve the strength of wire spoked wheels in a manner whereby the spoke heads at the rim are encased, the rim as a whole is strengthened, and a substantially flat, circumferential seat is provided for a tire.

Certain of the other objects and advantages will be noted hereinafter in connection with the following description of the accompanying drawing, which illustrates typical embodiments of the invention and in which—

The invention is directed, in general, to a vehicle wheel rim having a substantially flat circumferential surface to receive a tire and having removable side flanges or rings of such cross sectional configuration as to be capable of reversible interlocking positioning on the rim, for coaction, selectively, with quick detachable tires of the clincher or straight side types.

Figure 1:
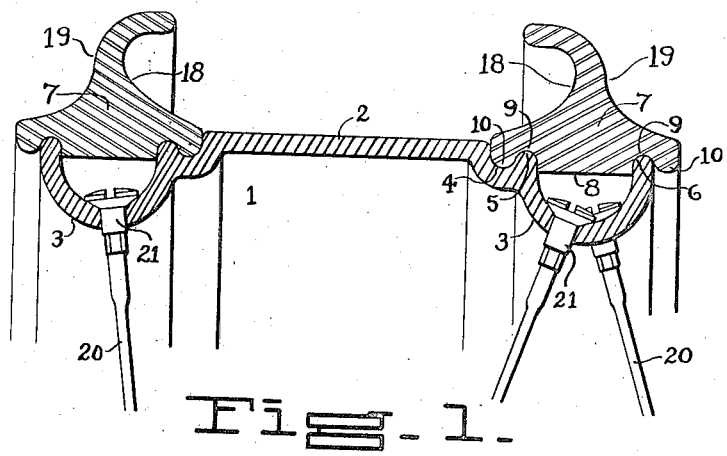
Figure 1 is a cross sectional view of an improved rim embodying the invention.

Referring more specifically to the drawing, there is shown in Fig. 1 a circumferentially continuous metal rim 1 having a central substantially flat surface 2 adapted to receive an inflatable or other suitable tire. The rim 1 is provided at its edges, that is, at the sides of the surface 2, with depressed channeled portions 3. In addition, the rim preferably has grooves 4 at the juncture of the portions 2 and 3 of a shape and size whereby the portions 3 terminate in symmetrical rounded beads 5 and 6.

Figure 4:
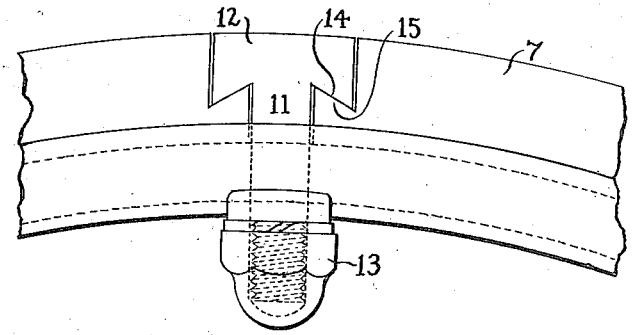
Fig. 4 is a partial side view of the rim showing a locking means for the removable side rings.

A pair of tire-holding rings or flange elements 7 are provided to fit removably on the sides of the rim 1 and, as shown, are provided with bases having a flat central body 8, spaced grooves 9, and further spaced rounded beads 10. It will be noted that the bases of the tire rings 7 are symmetrical in cross section and shaped complementary to the beads 5 and 6 and groove 4 of the rim portion 3, whereby the rings are adapted to seat on the rim and overlie the edge channels of the latter with the engaging surfaces of the rim and rings constituting interfitting parts which function to lock the elements named against relative lateral displacement. The side rings 7 are preferably split and sufficiently resilient to permit expansion whereby they may be fitted on or removed from the rims. When fitted on the latter, suitable convenient means will be provided to lock the same against accidental removal or circumferential creeping motion. In Fig. 4 a locking device for the purpose mentioned is shown as comprising a bolt 11 having a T-head 12 and a shank which extends through a complementary aperture in the channel portion 3 of the rim and has a threaded end to receive a nut 13. The T-head 12 of the bolt in cross-sectional shape preferably conforms substantially to the cross sectional shape of the ring 7 engaged thereby, while the bolt head and adjacent ends of the ring are shaped to provide interlocking cam edges 14 and 15 so that, as the bolt is tightened, the ends of the ring are drawn together and the latter is tightly anchored to the rim. A cup washer 16 and a spring washer 17 may be conveniently inserted between nut 13 and the inner surface of the rim channel portion 3.

Figure 2:
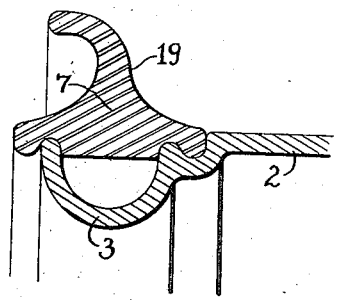
Fig. 2 is a similar partial view showing one of the removable tire-holding rings of Fig. 1 in reversed position.

The side rings or flanges 7 are preferably shaped, as shown in the various figures, to provide symmetrical sides 18 and 19 of a standard dimension and shape whereby the rings may be positioned with the sides 18, 18 facing each other (Fig. 1) to receive and coact with the beads of a tire of the well-known clincher type, or the rings may be reversed with the sides 19, 19 faced inward (indicated in Fig. 2) to receive and coact with the sides of a tire of the well-known straight side type. It will be observed that the single form of rim 1 lends itself to the interchangeable disposition of the side rings, as described, and that, in both positions of the latter, the lateral interlock between the parts is undisturbed.

The rim shown is particularly designed for embodiment in a wire spoke vehicle wheel, and in this form a plurality of wire spokes 20 which lace the hub to the rim, have their outer ends anchored in the channel portions 3 of the rim; that is to say, the latter are apertured at intervals and the spokes extended through the apertures and provided with nipples 21 or other headed enlargements which bear against the outer rim surface but are sunk in the rim channels. As a consequence, the side rings 7, when positioned, completely encase the heads of the tension spokes and effectually prevent outward projection of the latter, in case any become broken or loosened, whereby injury to the tire from such cause is eliminated. At the same time, quick removal of the side rings renders the spoke heads accessible when desired. It will also be observed that the provision of the grooved or channeled portions 3 at the sides of the rim substantially increases the strength of the latter to resist abnormal bending strains, and that the interlocking inner edges of the rings 7 with the complementary groove 4 and bead 5 of the rim establishes a secure interlock at points of great rigidity and strength.

Figure 3:
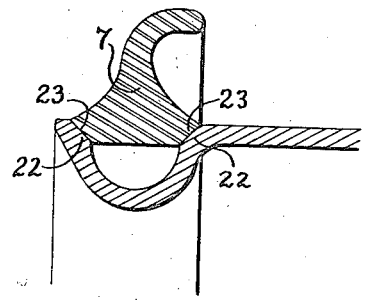
Fig. 3 is a partial sectional view of a modified embodiment of the invention.
Figure 5:
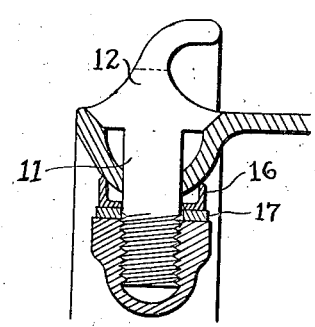
Fig. 5 is a sectional view on the line 5—5 of Fig. 4.

In the modification shown in Fig. 3, as well as in the locking means of Fig. 5, the rim 1 has the channeled portion 3, but the latter has its outer walls beveled at the corners 22 and the tire-holding ring 7 has its base correspondingly beveled at the corners 23. The operation and adaptability of the rim parts in this form, however, are readily apparent as similar to the corresponding parts already described. It will be noted, also, that the rim and the side rings might take other forms of interlocking cross sectional shape without sacrificing many of the advantages of function and structure gained in the embodiments of the invention as illustrated and described. Accordingly, it is to be understood that the language used in the following claims is intended to cover all of the generic and specific features of the invention herein described and all statements of the scope of the invenion which, as a matter of language, might be said to fall therebetween.

Having described my invention, what I claim as new and desire to secure by Letters Patent is:

1. In combination, a metal wheel rim having an integral channeled side portion and an adjacent groove constructed to provide spaced bearing surfaces, and a split ring having spaced grooves fitting over said bearing surfaces and having an adjacent bead fitting in said rim groove.

2. In combination, a metal wheel rim having a smooth tire-receiving surface and integral channeled side portions and grooves at the juncture of said surface and said channeled portions, said parts being constructed to provide spaced bearing surfaces at the sides of said channeled portions, and a pair of tire rings having spaced grooves fitting over said bearing surfaces and having adjacent symmetrical beads to selectively fit in said rim grooves whereby said rings are adapted to laterally interlock with said rim in reversible position.

In testimony whereof I affix my signature, in the presence of two witnesses.

CHARLES S. ASH.

Witnesses:
J. R. WATSON,
H. E. VAN HORN.